US012561232B2

(12) United States Patent
Oriol et al.

(10) Patent No.: US 12,561,232 B2
(45) Date of Patent: Feb. 24, 2026

(54) SEEDING CONTRADICTION AS A FAST METHOD FOR GENERATING FULL-COVERAGE TEST SUITES

(71) Applicant: Constructor Education and Research Genossenschaft, Schaffhausen (CH)

(72) Inventors: Manuel Oriol, Zurich (CH); Huang Li, Shenzhen (CN); Bertrand Meyer, Zurich (CH)

(73) Assignee: Constructor Education and Research Genossenschaft, Schaffhausen (CH)

( * ) Notice: Subject to any disclaimer, the term of this patent is extended or adjusted under 35 U.S.C. 154(b) by 59 days.

(21) Appl. No.: 18/238,640

(22) Filed: Aug. 28, 2023

(65) Prior Publication Data

US 2025/0077392 A1     Mar. 6, 2025

(51) Int. Cl.
*G06F 11/3668* (2025.01)

(52) U.S. Cl.
CPC ...... *G06F 11/3676* (2013.01); *G06F 11/3688* (2013.01)

(58) Field of Classification Search
CPC . G06F 11/263; G06F 11/3676; G06F 11/3688
USPC .................................................. 714/38.1, 41
See application file for complete search history.

(56) References Cited

U.S. PATENT DOCUMENTS

| | | | | |
|---|---|---|---|---|
| 8,875,074 | B1 * | 10/2014 | Busch ................. | G06F 30/3323 |
| | | | | 716/106 |
| 11,249,888 | B1 * | 2/2022 | Campos Perez .... | G06F 11/3684 |
| 11,550,923 | B2 * | 1/2023 | Weber ................. | G06F 11/3604 |

FOREIGN PATENT DOCUMENTS

| | | | | | |
|---|---|---|---|---|---|
| CN | 113434385 | A | * | 9/2021 | .......... G06F 11/3684 |
| EP | 2791803 | B1 | * | 11/2018 | .......... G06F 11/3684 |

OTHER PUBLICATIONS

B. Korel and A. M. Al-Yami, "Assertion-oriented automated test data generation," Proceedings of IEEE 18th International Conference on Software Engineering, Berlin, Germany, 1996, pp. 71-80 (Year: 1996).*
A. Nilizadeh, M. Calvo, G. T. Leavens and D. R. Cok, "Generating Counterexamples in the form of Unit Tests from Hoare-style Verification Attempts," May 2022 IEEE/ACM 10th International Conference on Formal Methods in Software Engineering (FormaliSE) (Year: 2022).*
Li Huang, et al. "Seeding Contradiction: A Fast Method for Generating Full-Coverage Test Suites", Constructor Institute. (2023).

* cited by examiner

*Primary Examiner* — Ashish Thomas
*Assistant Examiner* — Catherine Marie Nguyen
(74) *Attorney, Agent, or Firm* — ESPE Legal Consultancy FZ-LLC

(57) ABSTRACT

Systems and methods for checking the correctness of a computer program with at least one incorrect instruction inserted into at least one of a plurality of branches of the computer program. At least one prover generates a counterexample of computer program correctness in order to switch focus from a failed proof of the correctness of the computer program to a failed test of the correctness of the computer program.

18 Claims, 9 Drawing Sheets

300

Seeding contradiction into computer program block 302

Generating counterexamples 304

Selecting test suite 306

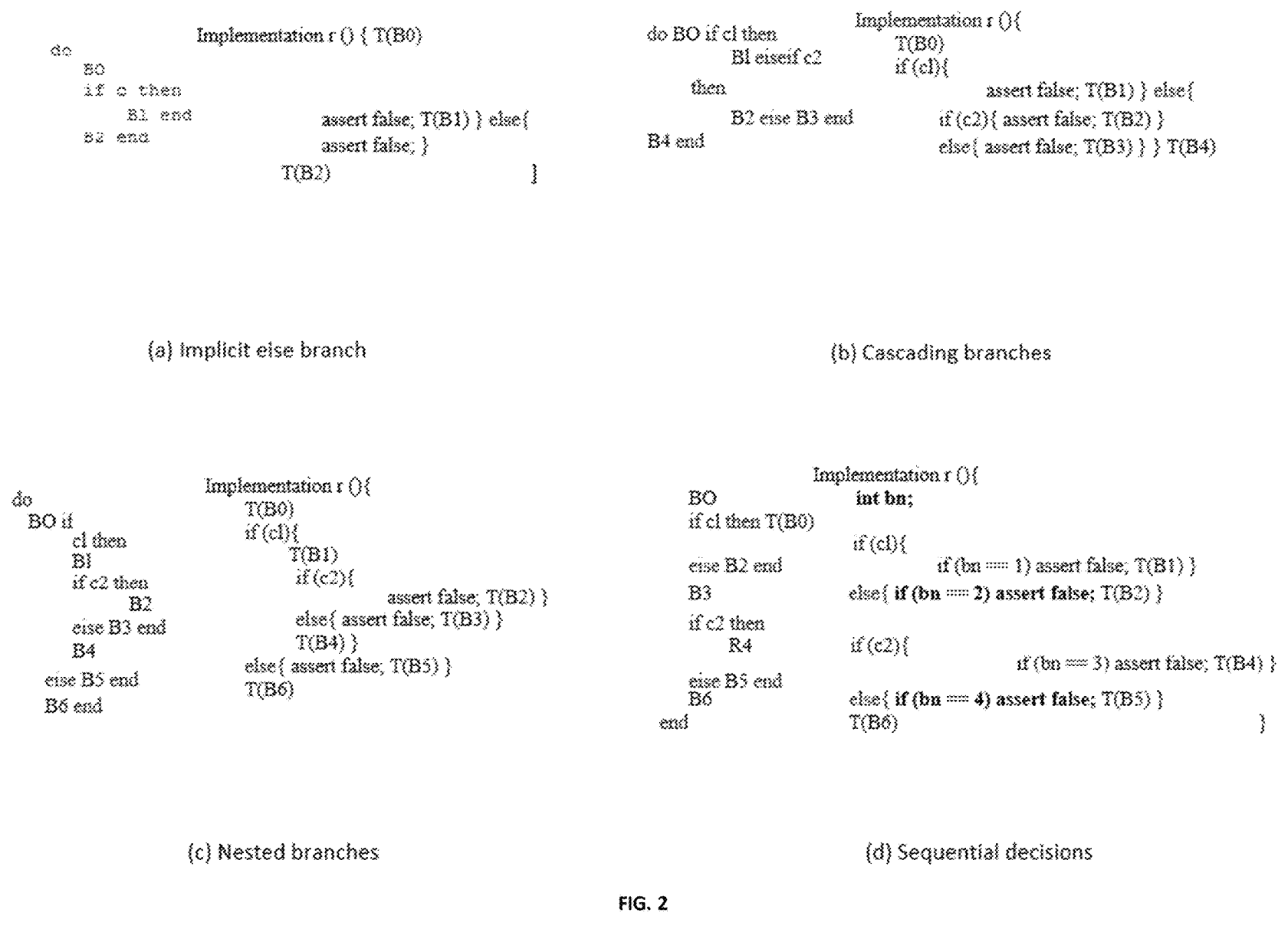

```
do
   B0
   if c then
      B1 end
   B3 end
```

```
Implementation r () { T(B0)
   if(c){
      assert false; T(B1) } else{
      assert false; }
   T(B2)
}
```

(a) Implicit else branch

```
do B0 if c1 then
        B1 elseif c2
   then
        B2 else B3 end
B4 end
```

```
Implementation r () {
   T(B0)
   if(c1){
      assert false; T(B1) } else{
      if (c2) { assert false; T(B2) }
      else{ assert false; T(B3) } } T(B4)
```

(b) Cascading branches

```
do if
   B0
   c1 then
   B1
   if c2 then
      B2
   else B3 end
   B4
   else B5 end
   B6 end
```

```
Implementation r () {
   T(B0)
   if(c1){
      T(B1)
      if(c2){
         assert false; T(B2) }
      else{ assert false; T(B3) }
      T(B4)}
   else{ assert false; T(B5) } }
   T(B6)
}
```

(c) Nested branches

```
B0
if c1 then T(B0)
else B2 end
B3
if c2 then
   R4
else B5 end
B6
end
```

```
Implementation r () {
   int bn;
   if(c1){
      if (bn == 1 ) assert false; T(B1) }
   else{ if (bn == 2) assert false; T(B2) }
   if(c2){
      if (bn == 3) assert false; T(B4) }
   else{ if (bn == 4) assert false; T(B5) }
   T(B6)
}
```

(d) Sequential decisions

FIG. 2

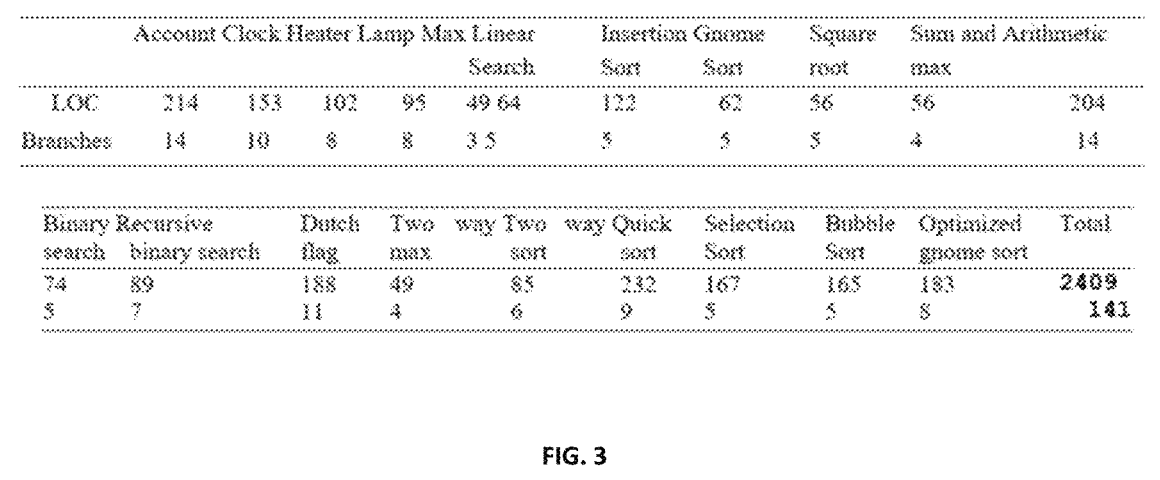

| | Account | Clock | Heater | Lamp | Max | Linear Search | Insertion Sort | Gnome Sort | Square root | Sum and Arithmetic max |
|---|---|---|---|---|---|---|---|---|---|---|
| LOC | 214 | 153 | 102 | 95 | 49 | 64 | 122 | 62 | 56 | 56 | 204 |
| Branches | 14 | 10 | 8 | 8 | 3 | 5 | 5 | 5 | 5 | 4 | 14 |

| Binary search | Recursive binary search | Dutch flag | Two max | way Two sort | way Quick sort | Selection Sort | Bubble Sort | Optimized gnome sort | Total |
|---|---|---|---|---|---|---|---|---|---|
| 74 | 89 | 188 | 49 | 85 | 232 | 167 | 165 | 183 | 2409 |
| 5 | 7 | 11 | 4 | 6 | 9 | 5 | 5 | 8 | 141 |

FIG. 3

| Metrics | SC | IntelliTest | AutoTest |
|---|---|---|---|
| Avg. branch coverage | 99.37 | 97.15% | 81.2% |
| Number of examples reaching exhaustive | 20 | 19 | 7 |
| Avg. time for reaching exhaustive coverage (s) | 0.487 | 27 | 259 |
| Avg. number of generated tests for reaching | 6.26 | 10.47 | 623.28 |

FIG. 4

Table 3. Result branch coverage

| | Account | Clock | Heater | Lamp | Max | Linear Search | Insertion Sort | Gnome Sort | Square root | Sum and max |
|---|---|---|---|---|---|---|---|---|---|---|
| SC | 100% | 100% | 100% | 87.5% | 100% | 100% | 100% | 100% | 100% | 100% |
| IntelliTest | 92.85% | 100 % | 100% | 50% | 100% | 100% | 100% | 100% | 100% | 100% |
| AutoTest | 78.6% | 70% | 62.5% | 87.5% | 66.7% | 100% | 80% | 60% | 100% | 100% |

| Arithmetic | Binary search | Recursive binary search | Dutch flag | Two way max | Two way sort | Quick sort | Selection Sort | Bubble Sort | Optimized gnome sort |
|---|---|---|---|---|---|---|---|---|---|
| 100% | 100% | 100% | 100% | 100% | 100% | 100% | 100% | 100% | 100% |
| 100% | 100% | 100% | 100% | 100% | 100% | 100% | 100% | 100% | 100% |
| 100% | 100% | 85.7 % | 72.7 % | 75% | 83.3% | 100% | 80% | 80% | 50% |

FIG. 5

Table 4: Result: time to reach maximum coverage

| | Account | Clock | Heater | Lamp | Max | Linear Search | Insertion Sort | Gnome Sort | Square root | Sum and max |
|---|---|---|---|---|---|---|---|---|---|---|
| SC | 0.56 | 0.44 | 0.85 | 0.39 | 0.37 | 0.36 | 0.42 | 0.52 | 0.26 | 0.37 |
| IntelliTest | 9.58 | 7.44 | 8.06 | - | 8.19 | 9.63 | 11.77 | 10.89 | 12.86 | 10.99 |
| AutoTest | - | - | - | 233.03 | - | 21.95 | - | - | 1.71 | 1322.61 |

| Arithmetic | Binary search | Recursive binary search | Dutch flag | Two way max | Two way sort | Quick sort | Selection Sort | Bubble Sort | Optimized gnome sort |
|---|---|---|---|---|---|---|---|---|---|
| 0.415 | 0.44 | 0.48 | 0.43 | 0.82 | 0.39 | 0.90 | 0.50 | 0.59 | 0.54 |
| 32.98 | 99.29 | 13.07 | 31.36 | 9.59 | 80.91 | 111.57 | 17.81 | 14.74 | 12.32 |
| 14.49 | 150.86 | - | 330.89 | - | - | 78.37 | - | · | · |

FIG. 6

Table 5: Result: number of generated tests to reach exhaustive coverage

| | Account | Clock | Heater | Lamp | Max | Linear Search | Insertion Sort | Gnome Sort | Square root | Sum and max |
|---|---|---|---|---|---|---|---|---|---|---|
| SC | 13 | 10 | 8 | 7 | 3 | 3 | 3 | 3 | 4 | 3 |
| IntelliTest | 13 | 13 | 8 | - | 4 | 7 | 5 | 7 | 5 | 5 |
| AutoTest | - | - | - | 656 | - | 127 | - | - | 18 | 1784 |

| Arithmetic | Binary search | Recursive binary search | Dutch flag | Two way max | Two way sort | Quick sort | Selection Sort | Bubble Sort | Optimized gnome sort |
|---|---|---|---|---|---|---|---|---|---|
| 14 | 4 | 7 | 9 | 2 | 5 | 9 | 5 | 4 | 7 |
| 25 | 6 | 15 | 27 | 4 | 9 | 18 | 12 | 8 | 8 |
| 531 | 905 | - | - | - | - | 343 | - | - | - |

Inserting incorrect instruction into computer program branch 202

Providing prover to generate counterexample of program correctness 204

SEEDING CONTRADICTION AS A FAST METHOD FOR GENERATING FULL-COVERAGE TEST SUITES

TECHNICAL FIELD

Embodiments relate generally to testing of computer programs. More particularly, embodiments relate to systems and methods for checking the correctness of a computer program using test suites.

BACKGROUND

In the modern theory and practice of software engineering, tests have gained a place of choice among the artefacts of software production, on an equal footing with code. One particularly important rule related to testing is that every deployed software program should come accompanied with a regression test suite achieving high branch coverage making it possible to check the software program.

However, producing a high-coverage regression test suite is a delicate and labor-intensive task. Tools exist, but they are typically dynamic, meaning that they require numerous executions of the code. Moreover, a key resource for managing program evolution needs to achieve 100% coverage (or be very close) to be useful.

Therefore, the manual creation of a test suite is unacceptably tedious, but existing automated methods are often inefficient. Therefore, there is a need for improved testing of computer programs.

SUMMARY

Embodiments described herein therefore solve the aforementioned disadvantages by providing a test suite for checking the correctness of a computer program.

In an embodiment, a method for checking the correctness of a computer program comprises inserting at least one incorrect instruction into at least one of a plurality of branches of the computer program, and providing at least one prover configured to generate a counterexample of computer program correctness, thus switching the focus from a failed proof of the correctness of the computer program to a failed test of the correctness of the computer program.

In an embodiment, a system for checking the correctness of a computer program comprises a computing device including at least one processor and memory operably coupled to the at least one processor; and instructions that, when executed by the at least one processor, cause the processor to execute: insertion of at least one incorrect instruction into at least one of a plurality of branches of the computer program, and at least one prover configured to generate a counterexample of computer program correctness, thus switching the focus from a failed proof of the correctness of the computer program to a failed test of the correctness of the computer program.

In an embodiment, a method for generating a test suite for a computer program comprises seeding at least one contradiction into at least one block of the computer program; generating a plurality of counterexamples based on the interaction of the at least one contradiction with the at least one block for a plurality of branches of the computer program; and selecting a test suite from the plurality of counterexamples.

BRIEF DESCRIPTION OF THE DRAWINGS

FIG. 2 is an example of seeding contradiction (SC) comprising two assert clauses with a series of branches placed sequentially, according to an embodiment.

FIG. 3 is a table of tools to generate tests for programs adapted from examples in AutoProof and corresponding characteristics, according to an embodiment.

FIG. 4 is a table of results from SC and IntelliTest examples, according to an embodiment.

FIG. 5 is a table of results for executed test suites and calculated coverage in form of ratios of numbers of exercised branches, according to an embodiment.

FIG. 6 is a table of time needed to produce the test suite in various approaches, according to an embodiment.

FIG. 7 is a table of sizes of the generated test suites, according to an embodiment.

DETAILED DESCRIPTION OF THE DRAWINGS

Figure 1:
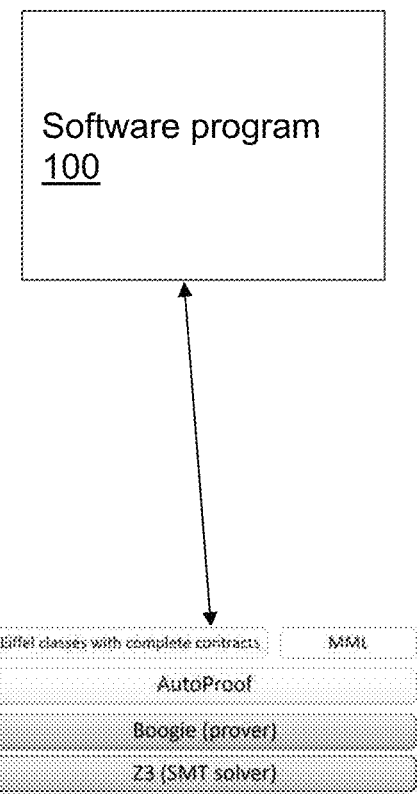
FIG. 1 is a block diagram of an AutoProof environment with a tool stack, according to an embodiment.

As described herein, the following terminology is for the purpose of describing particular embodiments only, and is not intended to be limiting.

Seeding

In computing and specifically peer-to-peer file sharing, seeding means uploading of already downloaded content for others to download from.

A peer is a computer that is connected to a network. The computer becomes a seed when it has acquired a certain amount of data.

The motivation to seed is mainly to keep a shared set of data or a shared file in circulation.

EXAMPLE EMBODIMENTS

Embodiments described herein include systems and methods for checking the correctness of a computer program.

An embodiment teaches that a prover generates a counterexample for the correctness of a branch of the computer program.

The prover is described in more detail below.

According to another embodiment the prover is an SMT based Hoare-Style prover.

Another embodiment shows that a test suite is formed from the number of counted samples.

According to another embodiment a test suite is formed from the collection of all counterexamples.

The computer program may be accompanied by a so called regression test.

Another embodiment teaches that the instruction inserted into at least one of a plurality of branches of the computer program is a so called "check C end" instruction.

The "check C end" instruction can be executed from a dynamic perspective, relating to the question, what happens if the instruction "check C end" gets executed and/or to a static, proof-oriented perspective.

According to an embodiment, when the prover is run and the failed proof (FP) of the correctness of the computer program is switched to a failed test (FT) of the correctness of the computer program (FP to FT), wherein the program is incorrect and the proof fails with the prover generating a counterexample.

In the static view, according to an embodiment, if the proof fails, an SMT-based prover will generate a counterexample.

From a dynamic viewpoint, executing the instruction means that, if the condition C has value "True" at that point, the check instruction has no effect other than the evaluating of C.

According to an embodiment, in the case that the program is correct, the test will pass and qualifies as a regression test.

Terms and Definitions

Seeding contradiction: The so called seeding contradiction inserts incorrect instructions into a basic block of the program. The seeding contradiction selects a test suite from the collection of all such counterexamples. Thus, the method of seeding contradiction is static. In embodiments, the seeding contradiction works fast and achieves excellent coverage. The seeding contradiction enables a so called SMT-based Hoare-style prover to generate a counterexample for every branch of the program.

Counterexample: A counterexample represents any exception to a generalization. In logic the counterexample disproves the generalization.

Hoare logic: The so called Hoare logic stands for a formal system with a set of logical rules for reasoning about the correctness of computer programs.

SMT: The so called SMT stands for satisfiability modulo theory, which is the problem of determining whether a mathematical formula is satisfiable. SMT generalizes the Boolean satisfiability problem (SAT) to more complex formulas involving real numbers, integers, and/or various data structures such as lists, arrays, bit vectors, and strings.

Prover: A prover refers to a person, device, or a program that performs logical or mathematical proofs. Modern program provers attempt to generate a counterexample of modern program correctness.

AutoTest: a test generation tool for Eiffel using so called adaptive random testing, specifically adaptive random testing for object-oriented software (ARTOO).

Method of Seeding Contradiction

A method of seeding contradiction inserts incorrect instructions into every basic block of a program. Seeding contradiction enables an SMT-based Hoare-style prover to generate a counterexample for every branch of the program. A collection of all such counterexamples leads to a test suite. Thus, the method of seeding contradiction is static, works fast and achieves excellent coverage.

In the following the seeding contradiction is referred to as SC. SC method and the supporting SC tools achieve 100% coverage. SC method and the supporting SC tools involve no execution of a code. As an effect, they ensure very fast results.

Proofs and Tests

The effect of SC is to exploit the power of modern program provers. Embodiments described herein provide at least one counterexample. A proof follows from the demonstrated inability to disprove a program's correctness. Switching the focus from proofs to tests, embodiments therefore look at counterexamples in a different way. Thus, embodiments refer to test cases instead of counterexamples.

Failed Proofs, Failing Tests and Relating Provisions

Failed proofs are referred to as FP. Failed tests are referred to as FT. Embodiments refer to failed proofs to failing tests or FP to FT.

FP to FT

As far as SC is concerned, embodiments use FP to FT as follows:

Full-coverage test suite: A full-coverage test suite is generated, by applying FP to FT to seeded versions of the program. In the program a branch has on purpose been made incorrect.

Generating a counterexample: For every variant, embodiments generate a counterexample exercising the corresponding branch of a program.

Result: The result for all branches is combined, yielding a high-coverage test suite.

FP to FT and Relating Provisions

The coverage of SC is normally 100%, with the following provisions:

Branch: Some branches may be unreachable. In other words, by definition, no test can cover the entire number of branches. Embodiments therefore help to identify such cases.

Exhaustive coverage: Embodiments use the term exhaustive coverage to mean 100% coverage of reachable branches.

Embodiments prevents that limitations of the prover reach less than 100%.

AutoProof Verification Framework for Contract-Equipped Eiffel

AutoProof: Embodiments utilize AutoProof as a verifier of an object-oriented program. AutoProof uses so called Boogie as a back-end.

Boogie: According to embodiments, Boogie refers to a tool. The tool (Boogie) accepts the so called Boogie language as input. The tool may also infer some invariants in the given Boogie program. Also Boogie (as a tool) generates at least one verification condition that may be passed to a so called SMT solver.

Embodiments involve an AutoProof verification framework for a contract-equipped Eiffel code.

Eiffel code: The so called Eiffel code refers to an object-oriented programming language.

The Eiffel code relies internally on a Boogie proof system and a so called Z3 SMT solver. The Eiffel code emphasizes declarative statements over procedural codes. The so called Eiffel code is more readable. It allows programmers to concentrate on the important aspects of a program. The Eiffel code has a certain simplicity that is intended to promote simple and/or extensible and/or reusable and/or reliable answers to computing problems.

Although embodiments include details specific to AutoProof, one skilled in the art will appreciate that the embodiments described herein are applicable to other implementations.

In the following, a number of examples are provided that exemplify embodiments of methods described herein.

Falsifying a Code Block

Embodiments rely on a simple code routine illustrating the fundamental idea.

A code routine consists of a single conditional instruction. Wherein:

```
simple (a: INTEGER)
do
if a > 0 then x := 1 else x := 2 end
end
```

Postcondition Part

In the routine:

x is an integer attribute of the enclosing class.

ensure that a>0=>x=1 a<0=>x=2

Regression Test Suite

Embodiments provide a regression test suite to ensure that two or more branches of a program run in a correct and appropriate manner.

In computer programming, a post-condition means that a condition or a predicate must always be true after the execution of a section and/or a code and/or after a certain operation has been performed.

Post-condition: Post-conditions may be tested by using assertions within a code itself. Post-conditions may be simply included in a documentation of an affected section of code.

Regression Testing: Regression Testing represents a type of testing in a software development cycle that runs after every change of the cycle. Regression testing is employed to ensure that changes made to a program do not introduce any unintended breaks.

To perform regression testing, embodiments comprise at least one SC technique. The SC technique may be static. In other words, the seeding contradiction technique does not involve executing the code.

Toolset for Proving Program Correctness

Embodiments provide a toolset for proving program correctness.

To prove program correctness as illustrated herein, embodiments utilize an AutoProof environment.

In the AutoProof environment the Boogie prover is based on the SMT solver. By way of example, the SMT solver may be a Z3 Theorem Prover.

Embodiments rely on a disproof of an opposite property. In other words, the SMT solver tries to construct at least one counterexample violating the desired result.

According to embodiments, if no counterexample can be found, the proof is successful.

FP to FT Approach and Related Proof

Embodiments therefore operate with a proof that actually fails.

When the proof performed by embodiments fails, then the counterexample can be useful on its own, yielding a directly usable test.

Embodiments devise a proof with the intention of making it fail.

The failed proof is not a proof of the actual program. Rather, it is a proof of a modified version, into which incorrect instructions have been inserted.

EXAMPLE

In the following example, embodiments changes the first branch, so that the routine now reads

```
simple (a: INTEGER)
do
if a > 0 then
check False end -- This is the added instruction
x := 1 -- The rest is unchanged.
else
x := 2
end
```

"Check C End" Instruction

According to embodiments, a so called "check C end" instruction (also referred to as: written assert C in some other notations) enables programmers to express that condition C is expected to hold at the corresponding program point.

Semantics in a Dynamic and a Static Perspective

As far as the dynamic and static perspective is concerned, corresponding semantics is the following: From the dynamic perspective the question is, what happens if the respective instruction gets executed. The static point of view refers to a proof-oriented perspective.

Dynamic Approach

From a dynamic viewpoint, executing the instruction means:

if condition C has value True at that point, the check instruction has no effect other than evaluating C.

If C evaluates to False and the programmer has enabled run time assertion monitoring, execution produces a violated-assertion exception, usually implying that it terminates abnormally.

Static Approach

According to embodiments, in a static approach, the intention is to prove that the program is correct.

According to embodiments, the semantics of the check instruction is that the program is correct if the condition C always has value True at a given program point.

Thus, according to embodiments, if the prover cannot establish the relevant property, the proof fails.

Thus, embodiments conclude that a key property for the general FP to FT approach is that in the static view, meaning that the proof fails, an SMT-based prover will generate a counterexample.

According to embodiments, in the seeding contradiction approach the following assumption applies.

When C is False it is implied that the proof always fails and the prover generates a counterexample exercising the corresponding branch.

When a simple code seeded with a check False end: such a counterexample will, by construction, lead to an execution of the first branch (a>0) of the conditional.

Turning Counterexamples into Tests

Embodiments provide a mechanism to turn at least one counterexample into at least one test.

The counterexample of embodiments provides a test of the original program which exercises a first branch of the conditional.

Properties of Embodiments of Tests

Test: The test can be produced even in the absence of a precise specification. The specification may refer to at least one contract element and/or one post-condition, referred to above.

Code: Unless the so called enclosing code is unreachable, the test can be produced whether the program is correct or incorrect.

Program: If the program is correct, the inventive test will pass. The inventive test is useful as a regression test. The regression test may fail in a later revision of the program that introduces a bug.

Generating the test: Generating the test does not require the execution of the test.

Generalizing the Production of the Test

In the following, embodiments show how to generalize the tests referred to above, not only for one branch but for a number of branches of the program. This is to obtain an exhaustive-coverage regression test suite.

Block Variables

Branch or Basic Block

A basic block may be defined as a sequence of instructions not containing conditionals or loops. A basic block may be a process node as opposed to a decision node in a flowchart of a program. The basic block may also be referred to as a block.

Application Examples

Multiple Seeded Program

Embodiments described herein include a method that generates a test guaranteed to exercise a specific block of a correct program.

The program is seeded by adding to the chosen block one check False end instruction. Then, embodiments run the prover. Additionally, embodiments apply the FP to FT scheme. The FP to FT scheme is applied since the program is now incorrect.

As the inventive proof fails, the prover generates a counterexample. The counterexample is turned into a runnable test. The runnable test is guaranteed to exercise the given block in the original program.

According to embodiments, a Multiple Seeded Program (MSP) generates a test suite exercising all blocks. The Multiple Seeded Programs generates a seeded program for each of its blocks.

A prover is run on every such program.

Thus, in each case a counterexample is produced.

Additionally, a test is generated from the counterexample. Testing the Correctness of the MSP Approach Using a Counter Example In an embodiment, a single program is designed. The single program produces the same counterexamples as would all the MSP-generated programs taken together.

According to embodiments, a prover being based on an inventive counterexample deals with a program containing several faults.

Thus, the counter example-based prover generates a set of counterexamples. Each counterexample addresses at least one fault. The counterexample-based prover deals with a program containing several faults. The counterexample-based prover generates a set of counterexamples. Each counterexample addresses one of the faults. Embodiments submit to the prover a single seeded program of the following form.

Repeatedly Single Seeded Program "RSSP"

```
simple (a: INTEGER) do
if a > 0 then
check False end
x := 1 -- Instruction 1 else check False end
x := 2 -- Instruction 2 end
end
```

According to embodiments, the single seeded program produces at least two counterexamples, one for each branch.

Using the AutoProof, the FP-FT tools generate tests with a=1 and a=0.

In other words, the prover initially generates larger and/or less intuitive values.

Previously known minimization techniques produce 1 and 0.

The RSSP may also comprise the following conditional:

```
This code comes after the above conditional:
(Instructions 1-2) if a2 > a then
x := 3 -- Instruction 3 else
```

-continued

```
x := 4 -- Instruction 4
end
```

With the program seeded as above, even if embodiments insert a check False end into each of the two new blocks (before Instructions 3 and 4), the test generated by embodiments obtain tests that cover only at least two cases.

The at least two cases may be referred to as:

(1-4, 2-4), not four (1-3, 1-4, 2-3, 2-4) as needed.

Wherein the two tests (a=1 and a=0) fail to cover instruction 3.

Accordingly, the prover does not generate specific tests for the branches of the second conditional (3-4). The reason being that the second conditional (3-4) correctly determines that the tests are unreachable, as both branches of the first conditional (1-2) now include a check False end. Both branches, however, may be reachable in the original. Thus, the test suite fails to achieve exhaustive coverage.

According to embodiments, the so called "Seeded Unreachability" render the checks themselves conditional.

In the Single Seeded Program (RSSP), embodiments number every basic block, from 1 to some N. Embodiments additionally add to the routine an argument bn. The abbreviation bn stands for "block number" with an associated precondition.

According to an embodiment:

bn>0—See below why 0 and not 1.

bn<N

To avoid changing the routine's interface, according to embodiments bn is a local variable.

Embodiments add an initial instruction.

The initial instruction assigns to bn a value between 0 and N.

Either way, embodiments use the following permission:

```
as seeded instructions,
no longer just check False end, but
if bn = i then check False end
end.
```

Wherein:

i is the number assigned to the block.

Wherein:

```
bn := Value chosen non-deterministically
between 0 and N if a > 0 then
if bn = 1 then check False end
end
```

Wherein:

```
x := 1 -- Instruction 1 else
if bn = 2 then check False end
x := 2 -- Instruction 2
end.
```

Wherein:

```
if a2 > a then
if bn = 3 then check False end
end.
```

Wherein:

```
x := 3 -- Instruction 3,
else
if bn = 4 then check False end
end.
```

Wherein:

```
x := 4 -- Instruction 4
end
```

Incorrect Check False Instructions

Embodiments realize at least four incorrect check False instructions. All of the four incorrect check False instructs are reachable for bn values, ranging from 1 to 4.

The prover generates counterexamples exercising all the paths of the original program with values for its original variables being appropriately generated.

Embodiments thereby know only one relevant variable, a in AutoProof.

According to embodiments, the prover generates, for the pair [bn, a], the test values [1, 1], [2, 0], [3, −1], [4, 0].

Embodiments realize that four tests provide:

100% branch coverage for the program, and can serve as a regression test suite.

According to embodiments, the technique may be referred to as conditional seeding.

Conditional Seeding

The theoretical correctness of embodiments of the methods described herein is examined in following sections of the description.

The Conditional seeding addresses the Seeded Unreachability issue.

Embodiments accept for bn not only values between 1 and N (representing the number of basic blocks) but also 0.

The inventive convention has no bearing on test generation and/or coverage. Rather, embodiments ensure that the behaviour of the original program remains possible in the seeded version. For:

for bn=0.

Accordingly, none of the seeded check False will execute. Thus the inventive program behaves exactly as the original.

If the original is correct, the prover will not generate any counterexample for that value.

Proof of Correctness of Test Suites

The goal of a test-suite-generation strategy is to produce high-coverage test suites. In fact, the inventors have discovered that the seeding contradiction strategy disclosed herein turns out to be highly effective.

Embodiments consider the seeding contradiction strategy to be correct if it achieves exhaustive coverage. For example, exhaustive coverage means full coverage of reachable branches. More precisely, embodiments prove that SC represents a so called "coverage-complete" if the prover is "reachability-sound" and/or "correctness-sound" and/or "counterexample-complete".

Assumptions for the Correctness of the SC

To establish the correctness of SC, embodiments utilize the following conventions and terminology.

Availability of an "FP to FT"

One assumption is the availability of an "FP to FT" mechanism. The "FP to FT" mechanism produces directly executable tests from counterexamples produced by the SMT-based prover.

The directly executable tests are expressed in a target programming language. The target programming language may be the programming language Eiffel.

For simplicity, embodiments assume that the programs are structured. Structuring means that the programs use sequences, loops and conditionals as their only control structures. Also, the embodiments consider that a conditional always includes an "else" part (possibly empty).

Further, according to embodiments, a loop has two blocks. Wherein the loop body and an empty block may correspond to the case of zero iterations.

Embodiments reveal that any expressions, particularly conditional expressions used in conditional instructions, are side-effect-free.

Embodiments utilize both an instruction coverage and a branch coverage that follow the same concept. The concept may be called just "coverage".

According to embodiments, an empty block of a program is reachable. The empty block may be reached if at least one set of input values will cause the block to be executed. Should the block turn out to be unexecutable, the block is unreachable. The reachability of the block is an undecidable property for any realistic programming language.

If a block is reachable, the prover will refer it to be reachable. Accordingly, the prover might wrongly refer to a block as reachable when in fact it is not.

Wherein:

```
if cos2 (x) + sin2 (x) = 100 then
y := 0
else y := 1
end.
```

Wherein, the prover might consider y=0 as a possible outcome, if it does not have enough built-in knowledge about trigonometric functions.

Embodiments reveal that a program contains instructions of the form "check C end", with no effect on execution.

According to embodiments, such an instruction is correct if and only if the condition C will hold on every execution of the instruction.

For the SC strategy embodiments are interested in the case for which C is False.

Again for simplicity, embodiments assume that all correctness properties are expressed in the form of check instructions.

Embodiments replace any contract elements and/or pre-conditions and/or post-conditions and/or loop invariants and/or variants and/or class invariants by such instructions added at the appropriate places in the program text.

Following the inventive convention, a block is correct if all its check instructions are. A program is correct if all its blocks are correct. In other words, for a normally written program the inventive definition means that the program is correct in the usual sense. Moreover, it is correct if the program has any contracts and/or if the program satisfies them. It may satisfy them by having every routine ensuring its post-condition.

By adding check False end to individual blocks, the SC strategy refers to both the blocks and the program as incorrect.

A test suite is a collection of test cases for a program.

According to embodiments, any test suite achieves exhaustive coverage if for every reachable block in the program at least one of its test cases causes the block to be executed.

Reachability-Sound Prover

Embodiments provide a reachability-sound prover. The reachability-sound prover wrongly marks some reachable blocks as unreachable. The reachability-sound prover wrongly reports exhaustive coverage, which is not acceptable.

If the block is reachability-sound, the reachability-sound prover may report less-than-exhaustive coverage for a test suite whose coverage is in fact exhaustive.

Coverage-Completeness

A test-suite-generation method is referred to as coverage-complete if the generated test suite achieves exhaustive coverage for any correct program. The test-suite-generation method may be a seeding contradiction (SC). In other words, for each reachable basic block of a correct program at least one test in the suite will execute the block.

Counterexample Prover

A prover that can generate counterexamples for a program cannot prove correct. In other words, the prover is counterexample-complete if it generates a counterexample for every block that it determines to be reachable and incorrect. If the prover is reachability-sound, correctness-sound and counterexample-complete, the SC is coverage-complete.

Proof of Correctness

To establish that correctness holds, on the basis of the preceding definitions, embodiments establish at least the following two doctrines. The doctrine may also be referred to as a lemma:

According to embodiments, any test case of a seeded program yields by omitting the bn variable.

According to embodiments, a test case of the original program yields, exercising the same basic block.

According to embodiments, any reachable block of the original program is reachable in the seeded one.

Proof of the Doctrines (Lemmas)

According to embodiments, the proof of both lemmas follows from the observation that the seeded program has the same variables as the original, except for the addition of the bn variable. In an embodiment, the bn variable only appears in the conditional check instructions. Thus the bn variable does not affect the behaviour of the program other than by possibly causing the execution of one of the instructions in the corresponding block referred to above.

If bn has a value i in such an execution, the execution of all blocks other than the block numbered i proceeds exactly as in the original unseeded program.

Result of the Proof of the Doctrines (Lemmas)

As a result:

Embodiments reveal that the test executes a block number i in the seeded program. Variable i has for all other variables values that cause execution of block i in the original program too, thus yielding Lemma 1.

The other variables refer to those of the original program.

Embodiments also reveal a reachable block numbered i of the original program. Since the block is reachable, a variable assignment exists for the variables of the original program that causes its execution. Eventually, the variable assignment complemented by bn=i causes an execution of block i in the seeded program. The program is therefore reachable yielding Lemma 2.

Prove of Satisfaction of the SC

To prove that SC satisfies the definition of correctness the assumption reads as follows:

The Original Program is Correct

Embodiments assume that the original program is correct:

When the only incorrect instructions in the seeded program are the added conditional check instructions.

The conditional check instructions refer to the instruction:

The "if C then check False end" at the beginning of every block.

Embodiments consider an arbitrary reachable basic block B of the original program. Because of Lemma 2, it is also reachable in the seeded program.

The prover is reachability-sound:

Then embodiments determine that block B is reachable. Wherein the block B is in the seeded program.

The prover is correctness-sound:

Then embodiments determine that B's seeded check instruction is incorrect. This follows the definition that B itself is incorrect.

If it is counterexample-complete:

Then embodiments set the rule that a counterexample is generated.

The counterexample executes B in the seeded program.

By Lemma 1 that counterexample yields a test that executes block B in the original program.

Depending on the definition of correctness set by embodiments the SC-strategy is correct.

Implementing Correctness in Practice

The following sections, application of embodiments of methods are described in practice.

To determine whether the implemented SC is correct, embodiments depend on properties of the prover. Accordingly, the inventive definition assumes that the prover is reachability-sound and/or correctness-sound and/or counterexample-complete.

Implementation of a Seeding Contradiction Strategy

AutoProof Program-Proving Framework

Embodiments implement a seeding contradiction (SC) strategy in the form of a new option of the AutoProof program-proving framework. The AutoProof program-proving framework is referred to as a "Full-coverage Test Generation".

According to embodiments, the implementation relies on the FP to FT feature of AutoProof. The FP to FT feature of AutoProof enables automatic generation of failed tests from failed proofs. The objective set by embodiments is to add at least one incorrect check instruction at the appropriate program location. Thus the verification of the seeded program results in proof failures. Proof failures yield an exhaustive-coverage test suite as described above.

Like the rest of AutoProof, seeding is modular: Routine by routine. It is applied at the Boogie level, so that the Eiffel program remains untouched.

Code for a Routine

Depending on the structure of the code for a routine "r", embodiments set at least five cases.

The cases are the following:

Plain Block

The body of r includes no condition and hence has only one path. Thus, the SC strategy inserts a single assert false at the beginning of the body.

According to embodiments, the verification of r results in a failure of the assertion. Applying FP to FT results in a valid test case of r. The test input of which satisfies the precondition.

Referring to FIG. 1, a block diagram of an AutoProof environment is depicted, according to an embodiment. As illustrated, an AutoProof environment comprises a tool stack, including a prover (Boogie), and a solver (Z3). In an embodiment, the Autoproof environment operates on software program 100. Accordingly, FIG. 1 includes a computing device including at least one processor and memory operably coupled to the at least one processor.

Referring to FIG. 2, an example seeding contradiction including two assert clauses with a series of branches placed sequentially is depicted, according to an embodiment.

If r contains a conditional whose else branch is implicit, SC makes it explicit and produces a test case covering the branch. FIG. 2, discussed further below, shows that SC inserts two assert clauses. The first assert clause is inserted in the then branch. The second assert clause is created in the else branch that is created by the then branch.

According to embodiments, running the proof produces two counterexamples:

The counterexamples are related to the two injected assert clauses. Hence they relate to two tests.

FIG. 2 shows an instrumentation for r:

With Left: original Eiffel code of r and

Right: seeded Boogie code.

Wherein:

Bi (i e $\{0, 1, 2, 3, 4, 5, 6\}$) is a basic block in Eiffel, and

Cj (je $\{1, 2\}$) is a branch predicate evaluating to true or false, and

T (Bi) is the Boogie translation of Bi.

FIG. 2 shows three leaf branches for blocks B2, B3 and B5.

Any execution going through B2 and B3 exercises B1.

According to embodiments, SC only inserts assert instructions for leaves (none for B1).

Should r offer multiple successive decision instructions, as shown in FIG. 2 (d), embodiments reveals that SC inserts the conditional check false instructions as explained in more detail above.

With a sequential decision:

a variable bn stands for the block number, then it adds if (bn==i) assert false.

Wherein:

the value bn is set between 0 and N (number of target blocks, the following clause requires:

bn>0 && bn<N" to the precondition of r.

Cascading Branches

Should r have a series of branches placed sequentially, as in FIG. 2 (b), then the SC algorithm inserts an assert false clause in each branch.

Thus, the resulting tests cover all branches.

Nested Branches

Embodiments reveal that, if conditions are nested, SC only generates tests targeting the leaf branches. Embodiments refer to leaf branches as branches that carry no embedded conditions. Embodiments regard nested branches to be sound. This is because any program execution that exercises a leaf branch must also go through all the branches leading to it.

Evaluation and Comparison with Dynamic Techniques

Test Generating Tools

Embodiments perform a performance evaluation of a SC as implemented in AutoProof.

The SC is compared to the existing test generation tools: IntelliTest

The IntelliTest is also known as Pex. Pex is a symbolic execution test-generation tool for .NET.

Comparison Criteria and Overview of the Results

Embodiments apply tools to generate tests for 20 programs. The tools are adapted from examples in the so called AutoProof tutorial and in benchmarks of previous software verification competitions.

Referring to FIG. 3, a table illustrating tools to generate tests for programs that are adapted from examples in Auto-Proof and corresponding characteristics is depicted, according to an embodiment.

Comparison

The comparison addresses three metrics:

The coverage and/or the time needed to generate the tests and/or the size of the test suite.

The examples shown above are originally set in Eiffel. Embodiments translate the Eiffel language terms into C# for IntelliTest.

Embodiments include a test generation session for every example in every tool. The algorithms of AutoTest keep generating tests until a pre-set time limit. In this example, embodiments use 10 minutes (600 seconds) as the limit. There is no time limit for the other two approaches.

According to embodiments, all sessions may take place on a machine with a 2.1 GHZ Intel 12-Core processor and 32 GB of memory. The memory may run on Windows 11 and/or Microsoft .NET 7.0.203. Embodiments may use versions such as: EiffelStudio 22.05 (used through Auto-Proof and AutoTest and/or Boogie 2.11.10); Z3 solver 4.8.14 and/or Visual Studio 2022 (integrated with IntelliTest).

Referring to FIG. 4, a table of results from SC and IntelliTest examples are depicted, according to an embodiment.

According to embodiments, SC and IntelliTest handle the examples with coverage close to 100%. SC reaches exhaustive coverage such as a 100% coverage of reachable branches for all 20 examples.

IntelliTest may be used for 19 examples.

Due to its random core, AutoTest achieves the lowest coverage, reaching exhaustive coverage for only seven examples. To reach the exhaustive coverage, SC performs significantly faster than the other two systems, referred to above.

SC needs less than 0.5 seconds on average. Thus SC needs about 50 times less than IntelliTest.

SC needs about 50 times less than AutoTest.

SC also generates the smallest test suite; according to embodiments, the average size of the exhaustive-coverage test suite from IntelliTest is slightly larger than SC. Both IntelliTest and SC are much smaller than AutoTest.

As is readily understood and exemplified by the afore-mentioned benefits, the importance of minimizing the size of test suites has become a crucial concern in the industry.

Detailed Results

The following sections describe the results achieved by methods described herein.

Referring to FIG. 5, a table of coverage results for executed test suites and calculated coverages is depicted, according to an embodiment. The results for executed test suites and calculated coverage are shown in form of ratios of numbers of exercised branches.

For each example, embodiments execute the generated test suite and calculate coverage as the ratio of number of exercised branches over the number of branches. Accordingly, SC always reaches exhaustive coverage.

For example, the maximum possible for Lamp is 87.5% as it contains an unreachable branch. IntelliTest reaches exhaustive coverage for most examples but misses it for Account and Lamp. AutoTest's coverage varies from 50% to 100%. Occasionally, AutoTest performs better than IntelliTest. Auto Test reaches the maximum 87.5% for Lamp against IntelliTest's 50%.

Referring to FIG. 6, a table of time to produce the test suite in the various approaches is depicted, according to an embodiment. In one example, the following conventions are used:

SC: For SC, the time for test generation includes two parts:

proof time (for AutoProof), and time for extracting tests from failed proofs. In other words: time for FP to FT.

AutoTest: For AutoTest the time is always the 10-minute timeout, chosen from experience.

The timeout is chosen in the time the test generation of examples usually reaches a plateau.

IntelliTest: IntelliTest does not directly provide time information.

Embodiments measure the duration manually. The measurement is done by recording the timestamps of session start and termination.

Accordingly, FIG. 6 shows the following:

SC: SC is the fastest of the three systems. With SC, all the test generation runs take less than 1 second.

IntelliTest: For IntelliTest, test generation takes less than 40 seconds for most examples, but three of them out of 20 require more than one minute.

AutoTest: For AutoTest, test generation time varies from 1.71 seconds for Square root to more than 20 minutes for Sum and max.

Referring to FIG. 7, a table of sizes of the generated test suites of the three tools when reaching exhaustive coverage is depicted, according to an embodiment.

SC: Among the three tools, SC generates the fewest tests.

In most cases, the number of tests matches with the number of blocks.

Each generated test results from a proof failure of an incorrect instruction. It is seeded at one program location.

Each test covers just the corresponding block and introduces no redundancy.

In case nested branches are present, the size of the test suite can be less than the number of branches.

SC generates tests targeting the innermost leaf branches.

Each test going through these branches automatically covers all its enclosing branches.

Intellitest: Intellitest also generates small test suites, but is slower.

Intellitest uses concolic testing which tests all feasible execution paths.

Since a branch can occur in several paths, a test will often identify a branch that was already covered by a different path.

AutoTest: As an Adaptive Random Testing tool, AutoTest generates much larger test suites. AutoTest often generates multiple test cases covering the same branches.

SC: The limitations of SC is a small sample size such as one iteration per example.

SC is fast and efficient. For example, SC uses less than 1 second to produce an exhaustive-coverage test suite with the fewest number of test cases.

Other observations relating to the systems referred to above read as follows: AutoTest does not guarantee that the test inputs satisfy the routine's precondition. Both SC and IntelliTest generate precondition-satisfying test inputs. The prerequisite of applying the SC approach is strict. The SC program under test conditions has to be proved correct. As far as generated test inputs are concerned, IntelliTest and AutoTest apply small values that are easy to understand. SC produces test inputs that may contain large values.

Figure 8:
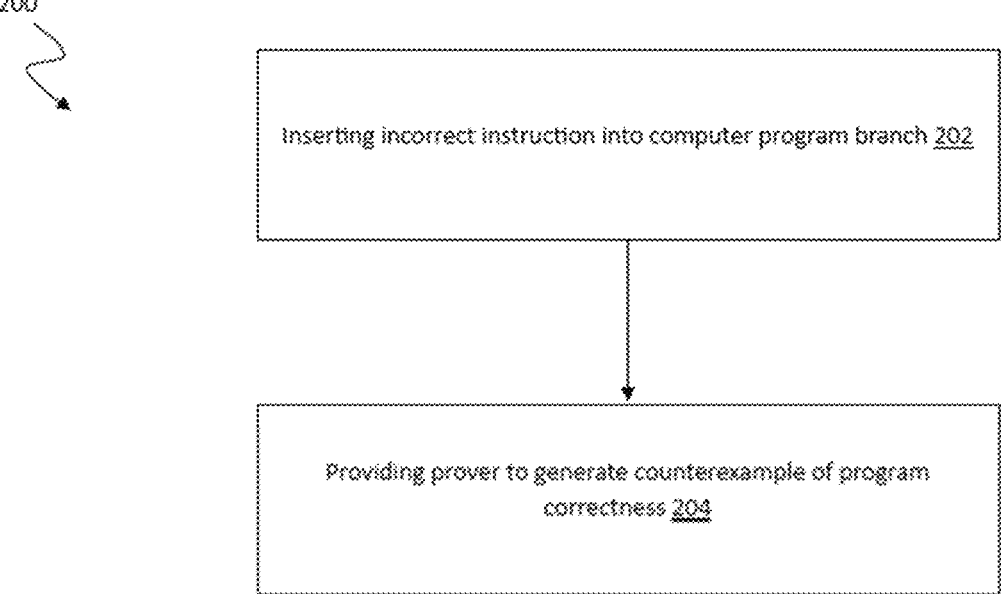
FIG. 8 is a method for checking the correctness of a computer program, according to an embodiment.

Referring to FIG. 8, a method 200 for checking the correctness of a computer program is depicted, according to an embodiment. At 202, method 200 comprises inserting at least one incorrect instruction into at least one of a plurality of branches of the computer program. At 204, method 200 further comprises providing at least one prover configured to generate a counterexample of computer program correctness, thus switching the focus from a failed proof of the correctness of the computer program to a failed test of the correctness of the computer program.

Figure 9:
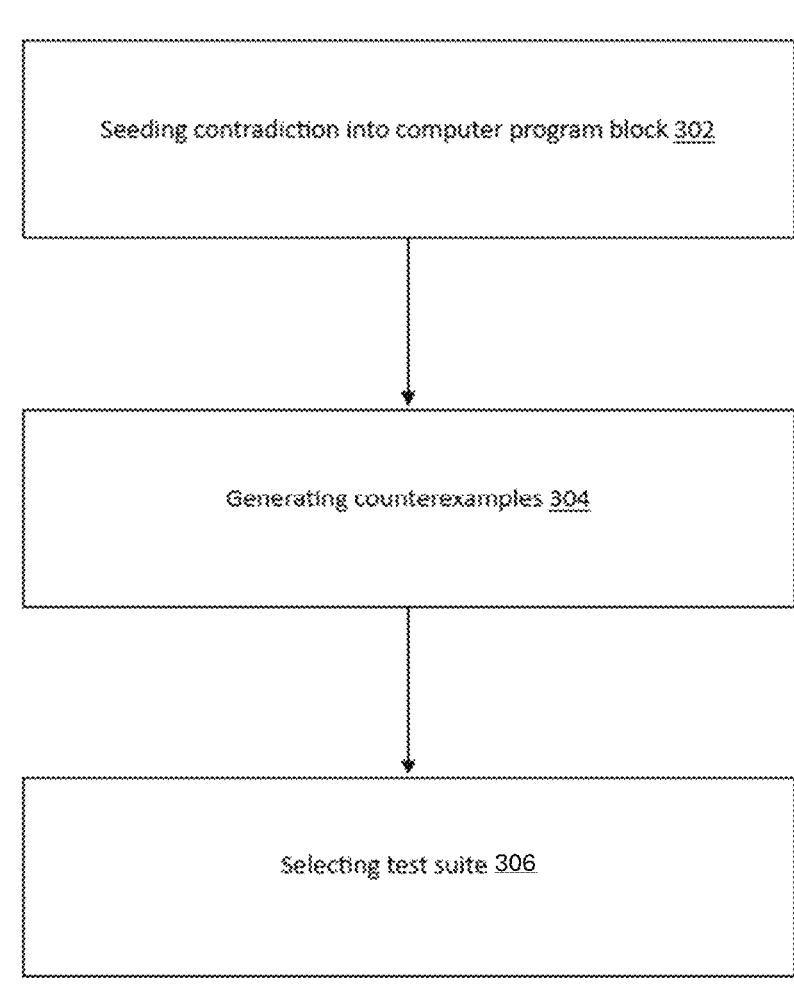
FIG. 9 is a method for generating a test suite for a computer program, according to an embodiment.

Referring to FIG. 9, a method 300 for generating a test suite for a computer program is depicted, according to an embodiment. At 302, method 300 comprises seeding at least one contradiction into at least one block of the computer program. At 304, method 300 further comprises generating a plurality of counterexamples based on the interaction of the at least one contradiction with the at least one block for a plurality of branches of the computer program. At 306, method 300 further comprises selecting a test suite from the plurality of counterexamples.

The invention claimed is:

1. A method for checking the correctness of a computer program, the method comprising:

assigning a unique identification number to each of a plurality of branches of the computer program, the computer program deployable as software in a computing environment;

intentionally inserting one incorrect instruction into each of a plurality of branches of the computer program on the computing device by accessing computer program code of each of the plurality of branches on the computing device, wherein the unique identification number is a precondition associated with the respective incorrect instruction; and providing at least one prover configured to:

generate a counterexample of computer program correctness by generating one specific counterexample for each of the plurality of branches of the computer program on the computing device using the unique identification number, thus switching the focus from a failed proof of the correctness of the computer program to a failed test of the correctness of the computer program, wherein the at least one prover is run and the failed proof of the correctness of the computer program is switched to a failed test of the correctness of the computer program, and wherein the computer program is incorrect and the proof fails with the at least one prover generating a counterexample.

2. The method according to claim 1, wherein the at least one prover generates a counterexample for the correctness of a branch of the computer program.

3. The method according to claim 1, wherein the at least one prover is a Satisfiability Modulo Theory (SMT)-based Hoare-Style prover.

4. The method according to claim 1, wherein a test suite is formed a plurality of counterexamples.

5. The method according to claim 1, wherein a test suite is formed from a collection of all counterexamples.

6. The method according to claim 1, wherein the computer program is accompanied by a regression test.

7. The method according to claim 1, wherein the one incorrect instruction inserted into at least one of a plurality of branches of the computer program is a "check C end" instruction.

8. The method according to claim 7, wherein the "check C end" instruction is executed using a dynamic perspective based on if the "check C end" instruction gets executed and/or a static, proof-oriented perspective.

9. The method according to claim 1, wherein in a static view, if the proof fails, a Satisfiability Modulo Theory (SMT)-based prover generates a counterexample.

10. The method according to claim 8, wherein from a dynamic perspective, executing the instruction further includes if a condition C has a value "True" at executing the instruction, the "check C end" instruction has no effect other than evaluating C.

11. The method according to claim 1, wherein the counterexample provides a test of the computer program, and wherein in case the computer program is correct, the test passes and qualifies as a regression test.

12. A system for checking the correctness of a computer program, the system comprising:

a computing device including at least one processor and non-transitory computer readable memory operably coupled to the at least one processor, and instructions stored in the non-transitory computer readable memory that, when executed by the at least one processor, cause the processor to execute:

assigning a unique identification number to each of a plurality of branches of the computer program, the computer program deployable as software in a computing environment, intentional insertion of one incorrect instruction into each of a plurality of branches of the computer program on the computing device by accessing computer program code of each of the plurality of branches on the computing device, wherein the unique identification number is a precondition associated with the respective incorrect instruction, and at least one prover, comprising at least a portion of the instructions, configured to generate a counterexample of computer program correctness by generating one specific counterexample for each of the plurality of branches of the computer program on the computing device using the unique identification number, thus switching the focus from a failed proof of the correctness of the computer program to a failed test of the correctness of the computer program, wherein the at least one prover is run and the failed proof of the correctness of the computer program is switched to a failed test of the correctness of the computer program, and wherein the computer program is incorrect and the proof fails with the at least one prover generating a counterexample.

13. The system of claim 12, wherein the at least one prover generates a counterexample for the correctness of a branch of the computer program.

14. The system of claim 12, wherein the at least one prover is a Satisfiability Modulo Theory (SMT)-based Hoare-Style prover.

15. The system of claim 12, wherein a test suite is formed from a plurality of counterexamples.

16. The system of claim 12, wherein a test suite is formed from a collection of all counterexamples.

17. The system of claim 12, wherein the computer program is accompanied by a regression test.

18. A method for generating a test suite for a computer program, the method comprising:

assigning a unique identification number to each of a plurality of blocks of the computer program, the computer program deployable as software in a computing environment seeding one contradiction into each block of the computer program on the computing device by accessing computer program code of each of the plurality of blocks on the computing device, wherein the unique identification number is a precondition associated with the respective contradiction;

generating a plurality of counterexamples based on the interaction of the contradiction with each block for a plurality of branches of the computer program by generating one specific counterexample for each of the plurality of branches of the computer program on the computing device using the unique identification number; and selecting a test suite from the plurality of counterexamples, wherein at least one prover is run to generate the plurality of counterexamples and a failed proof of the correctness of the computer program is switched to a failed test of the correctness of the computer program, and wherein the computer program is incorrect and the proof fails with the at least one prover generating a counterexample.

* * * * *